UNITED STATES PATENT OFFICE.

JOHN H. STEVENS, OF NEWARK, NEW JERSEY, ASSIGNOR TO THE CELLULOID COMPANY, OF NEW YORK, N. Y., A CORPORATION OF NEW JERSEY.

PYROXYLIN COMPOSITION OF MATTER.

SPECIFICATION forming part of Letters Patent No. 607,554, dated July 19, 1898.

Original application filed November 7, 1895, Serial No. 568,212. Divided and this application filed April 6, 1898. Serial No. 676,640. (No specimens.)

*To all whom it may concern:*

Be it known that I, JOHN H. STEVENS, of the city of Newark, county of Essex, and State of New Jersey, have invented certain new and useful Improvements in Pyroxylin Compounds, of which improvements the following is a specification.

The various compositions to which the present invention relates are employed in the arts mainly as imitations of substances; and it consists of soluble pyroxylin combined with or dissolved in certain other substances or menstrua known as "solvents of pyroxylin." The various applications of this class of pyroxylin compounds include varnishes, waterproofing solutions containing oils, spreading solutions for the manufacture of films, plastic compositions for molding, rolling, and stuffing, and the hard solids used in imitation of shell, horn, amber, glass, cloth, marbles, &c. Although the final or useful form of the different compounds of this class is that of a solid or dried material, the different processes of conversion into this final solid form involve, as is well understood, the employment of pyroxylin solutions or mixtures of varying consistency as to plasticity, stiffness, or fluidity, dependent generally on the proportion and kind of solvent used to the amount of pyroxylin. There are two classes of solvents—liquid solvents, of which wood-spirit is a good example, and solid solvents, of which camphor is a good representative. Solvent mixtures are also formed by combining two or more substances with each other. The components of the mixed solvent in such a case may not necessarily be possessed of individual solvent power. For instance, alcohol, which is practically a non-solvent in itself, forms a good solvent mixture with camphor dissolved in it. The various applications require the employment of complex mixtures in the solvent, single substances being rarely used for such purposes. Hence while the advancement of this art has, as is well understood, depended largely on the discovery and application of new single-solvent substances, yet it has required also the invention of combinations of solvents by which effects are produced quite different from those produced when single solvents are employed alone.

The action of solid solvents is quite distinct from that of liquids in that the solid solvent, after the seasoning or drying of the material, remains as a part of the finished product and gives the property of plasticity under heat, as is well understood. Although numerous solid solvents have been discovered and applied, camphor is still regarded as a solvent of great importance in this art, notwithstanding the difficulties attending its use. Hence special attention has been directed to so modifying the action of the camphor that its excellent solvent powers and other characteristics can be advantageously utilized.

The principal objection to the use of camphor is its high melting-point, which necessitates the use of so much heat in molding the thoroughly-dried compounds containing camphor that there is a tendency to discoloration. The difficulty has been met to a certain extent by leaving in the final product a small proportion of liquid solvent, such as alcohol, which lowers the melting-point of the camphor and permits the manipulation of the compounds without destroying the good qualities of the material. There is such a wide difference, however, between the volatility of the camphor and the liquid menstruum or menstrua employed with it that it is difficult to control the plastic properties by such means, because the relative proportion of camphor and the liquid solvent varies according to the conditions of evaporation or seasoning.

It is the object of the present invention to form pyroxylin compounds in such a manner that their plasticity will be independent of the presence of liquids in the compounds. To accomplish this, I employ in conjunction with the camphor certain other solid substances which I have discovered possess the power to form, with the camphor and pyroxylin, a compound which is plastic at lower temperatures than if they were omitted. These solid substances combine with the camphor to form a solid solvent—that is, a solid which when melted by means of heat dissolves pyroxylin.

The group of substances which I employ for this purpose, while possessing the common property of forming useful solvents in conjunction with camphor, yet have varying individual characteristics which they impart to a certain extent to the pyroxylin compound, which renders them of double value. The group to which I refer embraces certain crystalline derivatives of phenols or aromatic alcohols, and consists of the following substances: dimethylhydrochinon, thymochinon, thymol, and benzoylguaiacol.

Dimethylhydrochinon, ($C_8H_{10}O_2$:) This forms colorless products and is especially valuable on account of its odorless and practically non-volatile character.

Thymochinon, ($C_{10}H_{12}O_2$:) This substance can only be used for dark-colored mixtures.

Thymol, ($C_{10}H_{14}O$:) This substance also forms pale products and is preferably employed either for transparent mixtures or in connection with pigments of such a nature that they will not chemically combine with it.

Benzosol or benzoylguaiacol, $C_6H_4(OCH_3)O.CO.C_6H_5$: Compositions made with this substance are pale and colorless.

For additional information as to the state of the art and the various manipulations to which pyroxylin compounds are subjected I refer to my United States Patents Nos. 517,987, 542,692, and 543,197.

A mixture of camphor with any one member or combinations of different members of the group herein enumerated can be substituted for camphor or other solid solvents employed in manufacturing pyroxylin compounds and in the same proportions that are employed when camphor alone is used as the solid solvent.

As to the proportions to be used, I have found that satisfactory results are obtained by employing three or four parts of camphor to one part of any one member (or one part of a mixture of two or more members) of this group of substances; but these proportions may be varied, especially in cases where special effects are desired. For instance, the properties of thymol can be utilized even with much smaller proportions of the thymol when compounds containing oxidizable oils, or oils which are subject to rancidity, are made. I find that thymol perceptibly retards the offensive changes which castor-oil compounds undergo in the course of time. Some of these substances are of difficult solubility in the ordinary liquid menstrua employed in this art; but I have found that when mixed with camphor in the proportions given they are sufficiently soluble for practical work. The employment of my new solvents is not incompatible with the use of other solid solvents in connection with it, should the necessities of the case require such mixtures.

It will be evident to the experienced operator in this art that as the plasticity of the seasoned pyroxylin compounds made with these new solvents depends on the solvent power of the camphor acting in conjunction with one or more members of the specified group of new substances any heating of these compounds when in a dry or seasoned condition, even in the presence of liquid solvents, (the liquid solvent being insufficient in itself to give the desired plasticity to the compound,) is a use of the solvents of this specification. It is also true that regardless of the process used or in what order the ingredients are mixed the presence at any time of my new solvents in the compound imparts properties to such compound which it would not otherwise possess and is a utilization of my invention. I do not confine myself, therefore, to the use of any particular proportions of the substances embraced in the group of my new solvents nor to any particular method in which they are used in pyroxylin compounds.

The result of my mixtures is either a fluid solution or a plastic mass, either of which, when properly applied, manipulated, or formed into shape and then dried by allowing the liquid solvent to evaporate, becomes a pyroxylin compound capable of being softened or formed into new shapes by the aid of heat and pressure in the customary manner.

By the application of heat or heat and pressure to the manipulation of these compounds I mean such operations as are commonly used in this art to mold or shape the seasoned or partly-seasoned product, whether it be by shaping in hot water, or forcing under heat through stuffing machinery, or molding and embossing in heated dies, or manipulating in heated rolls, or any analogous method.

This specification is a division of my original application filed November 7, 1895, Serial No. 568,212.

Having thus described my invention, what I claim, and desire to secure by Letters Patent, is—

1. The process of manufacturing pyroxylin compounds which consists in combining pyroxylin with camphor and one or more members of the hereinbefore-specified group of crystalline derivatives of phenols or aromatic alcohols consisting of dimethylhydrochinon, thymochinon, thymol, and benzoylguaiacol, and afterward subjecting the mixture to heat and pressure sufficient to render the compound plastic, substantially as described.

2. The process of manufacturing pyroxylin compounds, which consists in mixing pyroxylin with camphor, one or more members of the hereinbefore-specified group of crystalline derivatives of phenols or aromatic alcohols consisting of dimethylhydrochinon, thymochinon, thymol, and benzoylguaiacol, and a liquid menstruum or liquid menstrua, and afterward subjecting the mixture to heat and pressure sufficient to render the compound plastic, substantially as described.

3. A new composition of matter consisting of pyroxylin, camphor and one or more members of the hereinbefore-specified group of crystalline derivatives of phenols or aromatic alcohols consisting of dimethylhydrochinon, thymochinon, thymol, and benzoylguaiacol, substantially as set forth.

4. The process of manufacturing pyroxylin compounds, which consists in intimately mixing pyroxylin, camphor, one or more members of the hereinbefore-specified group of crystalline derivatives of phenols or aromatic alcohols consisting of dimethylhydrochinon, thymochinon, thymol, and benzoylguaiacol, and a liquid menstruum or liquid menstrua, sufficient in amount to convert the entire mixture into a pyroxylin solution or compound, substantially as described.

5. As a new composition of matter, a compound of pyroxylin containing pyroxylin, camphor, one or more members of the hereinbefore-specified group of crystalline derivatives of phenols or aromatic alcohols consisting of dimethylhydrochinon, thymochinon, thymol, and benzoylguaiacol, and a liquid menstruum or liquid menstrua, substantially as described.

6. As a new composition of matter, a compound of pyroxylin containing pyroxylin and one or more members of the hereinbefore-specified group of solid ingredients consisting of dimethylhydrochinon, thymochinon, thymol, and benzoylguaiacol, substantially as described.

7. A new composition of matter containing pyroxylin and thymol.

JOHN H. STEVENS.

Witnesses:
ABRAHAM MANNERS,
J. W. FAITOUT.